June 14, 1938.  E. T. FERNGREN  2,120,328
METHOD OF SHAPING SHEET MATERIAL
Filed Jan. 31, 1933  10 Sheets-Sheet 1
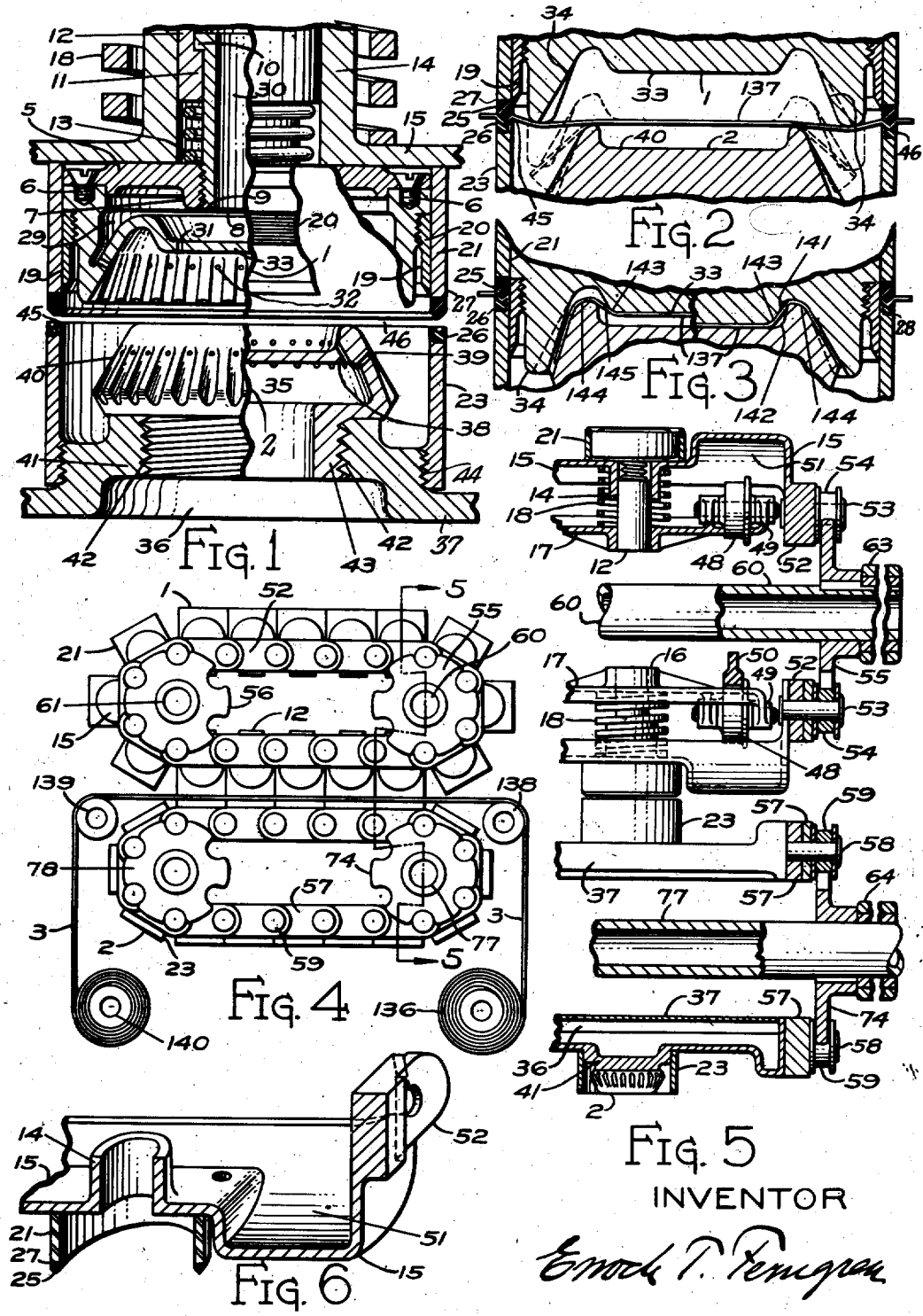
INVENTOR
Enoch T. Ferngren

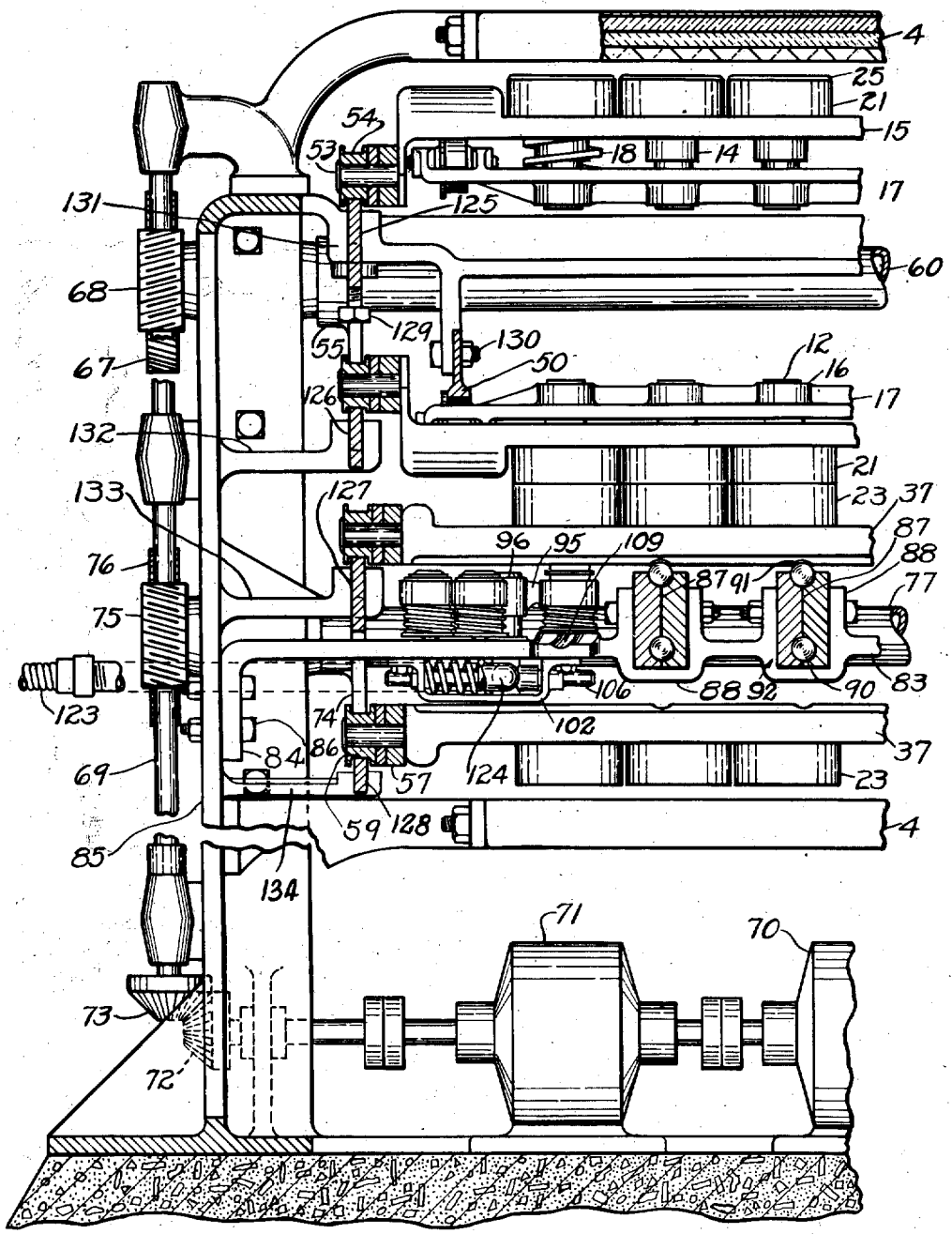

June 14, 1938.  E. T. FERNGREN  2,120,328
METHOD OF SHAPING SHEET MATERIAL
Filed Jan. 31, 1933  10 Sheets-Sheet 4
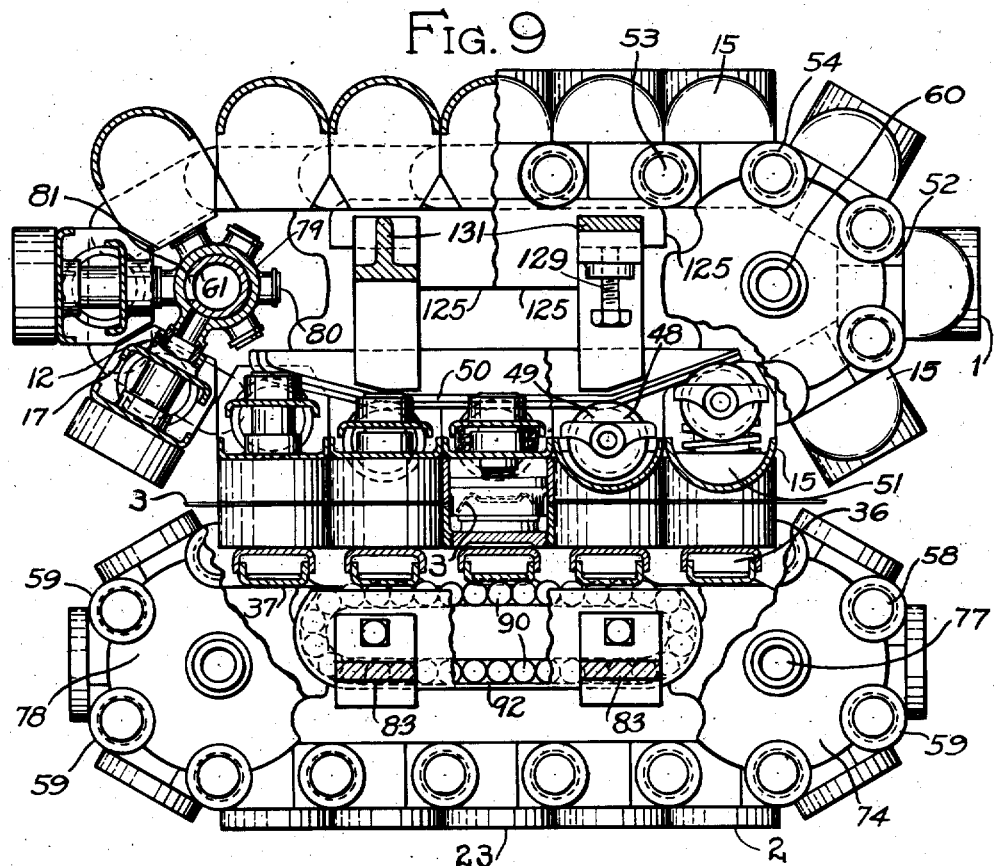
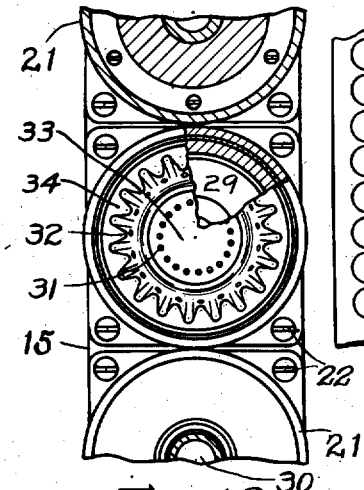
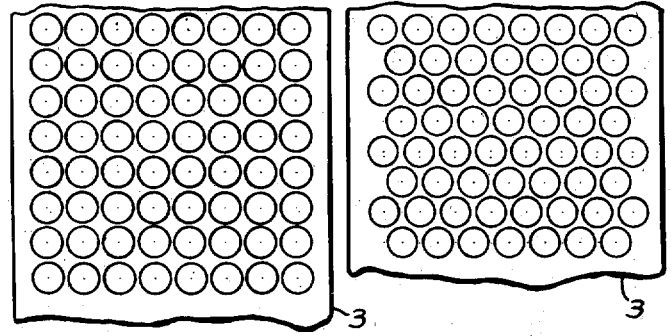
INVENTOR
Enoch T. Ferngren June 14, 1938.  E. T. FERNGREN  2,120,328
METHOD OF SHAPING SHEET MATERIAL
Filed Jan. 31, 1933  10 Sheets-Sheet 5
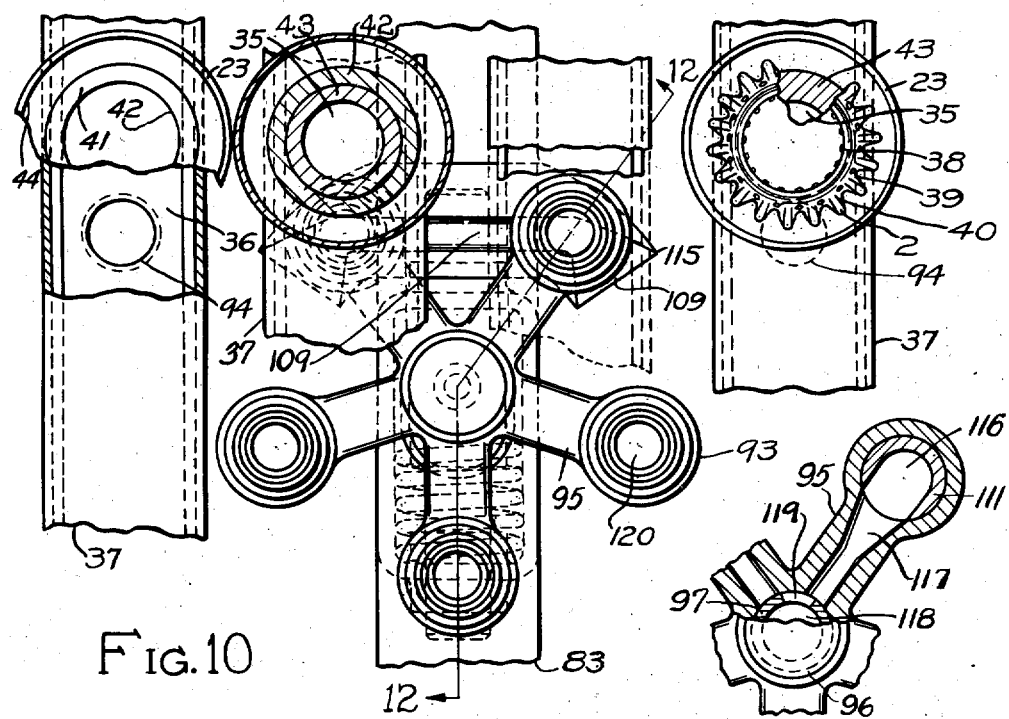
Fig. 10
Fig. 11
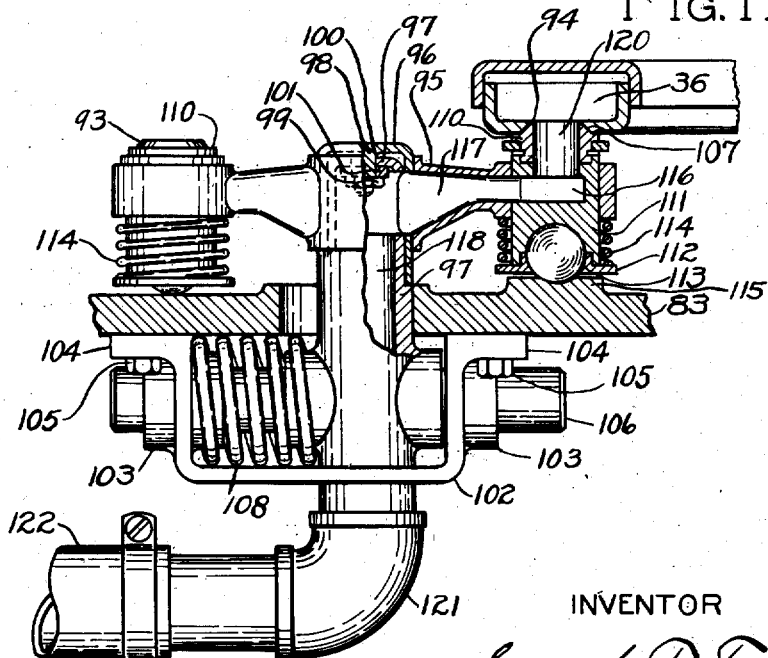
Fig. 12
INVENTOR
Enoch T. Ferngren

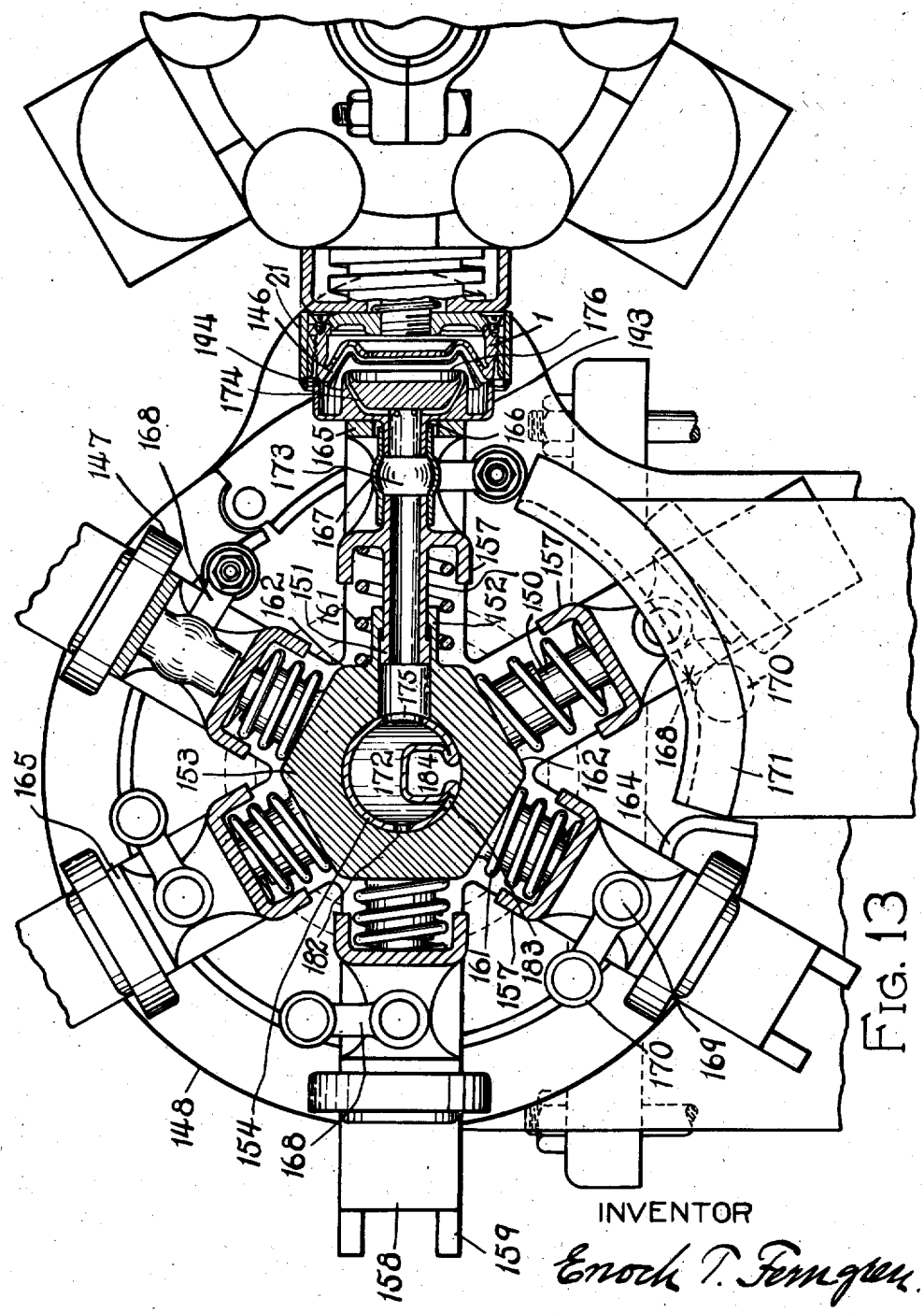

June 14, 1938.　　　　　E. T. FERNGREN　　　　　2,120,328
METHOD OF SHAPING SHEET MATERIAL
Filed Jan. 31, 1933　　　10 Sheets-Sheet 7
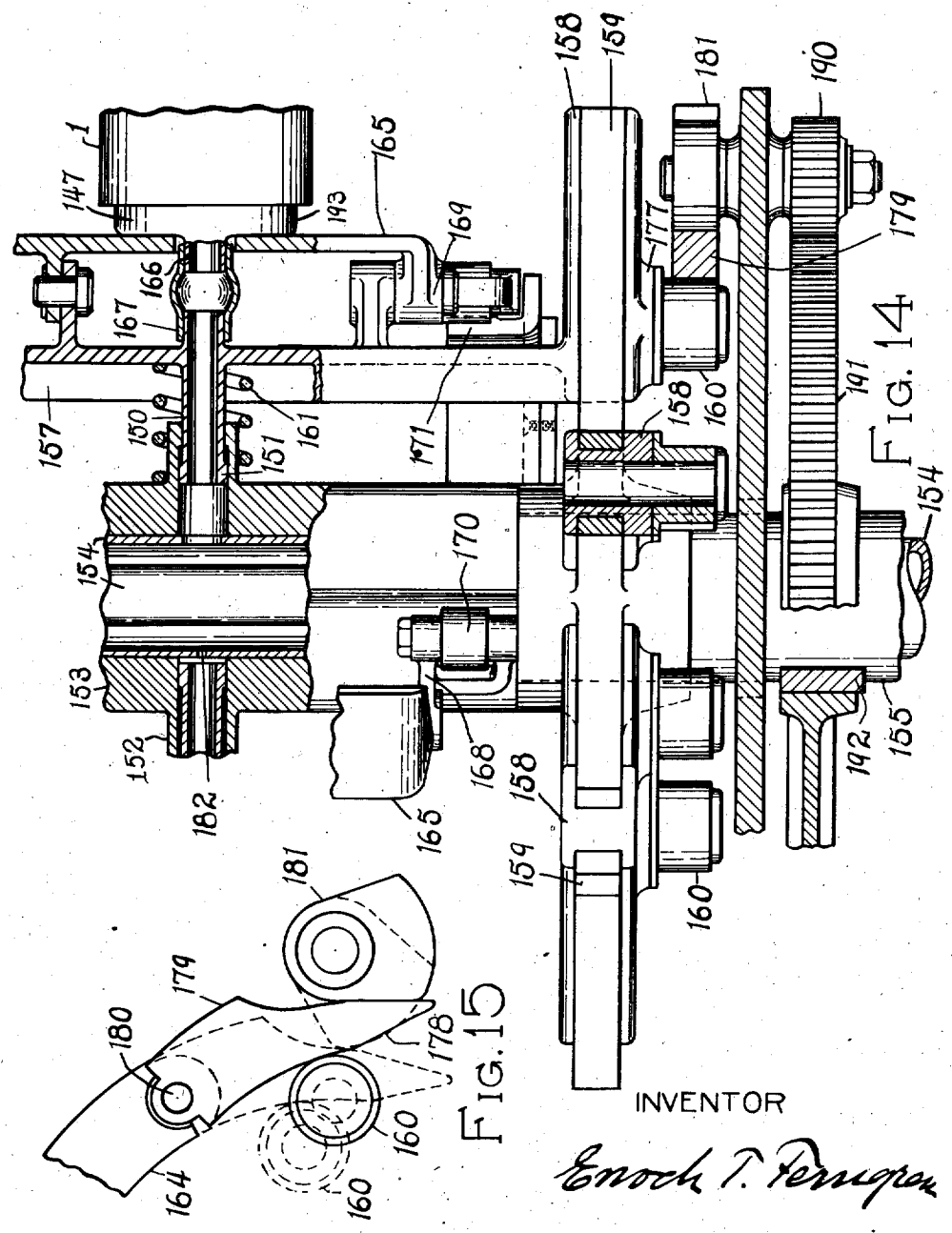
INVENTOR
Enoch T. Ferngren

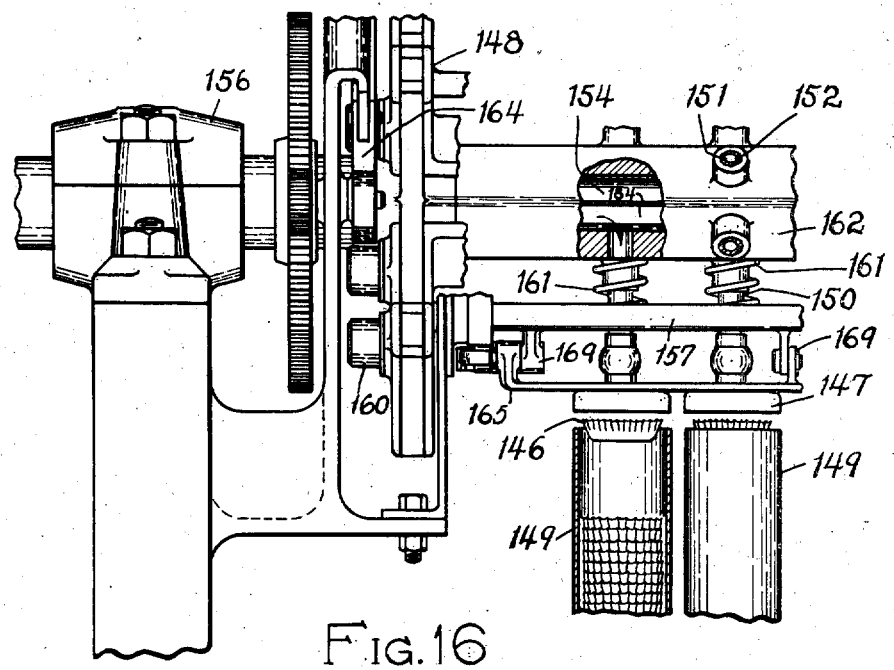
Fig. 16
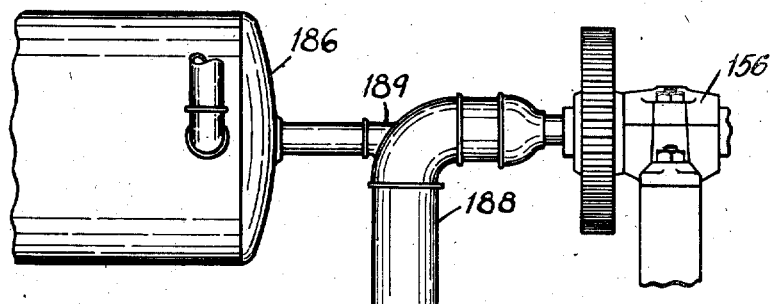
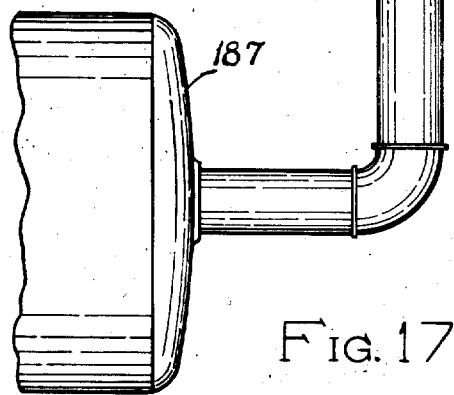
Fig. 17
INVENTOR
Enoch T. Ferngren

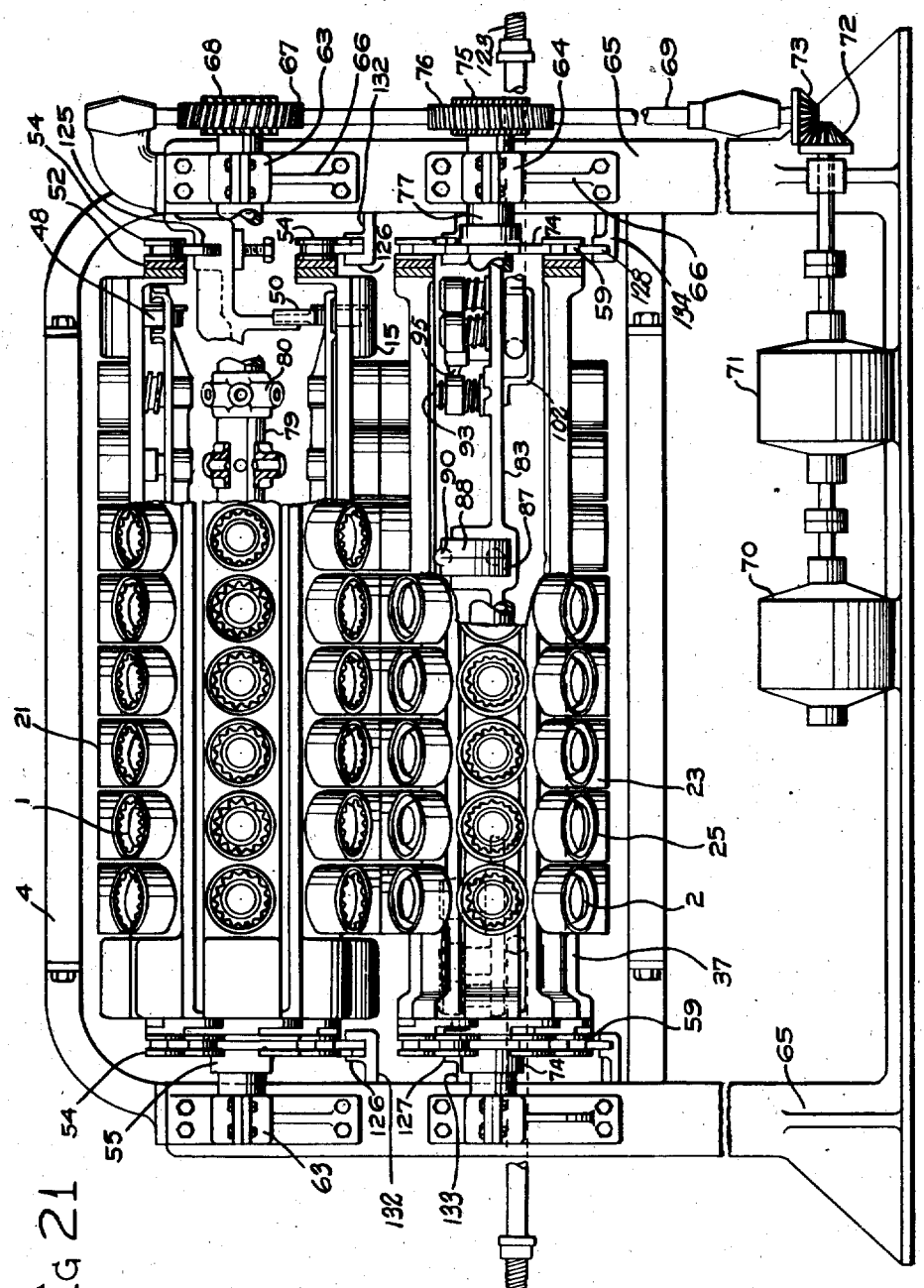

June 14, 1938.  E. T. FERNGREN  2,120,328
METHOD OF SHAPING SHEET MATERIAL
Filed Jan. 31, 1933     10 Sheets—Sheet 10
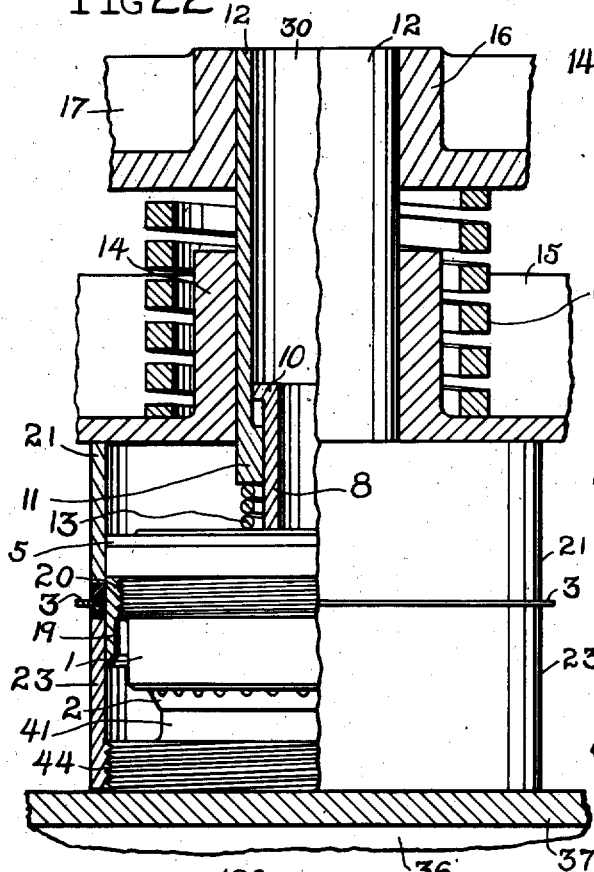
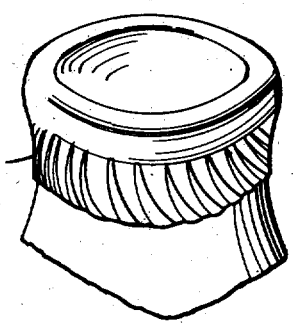
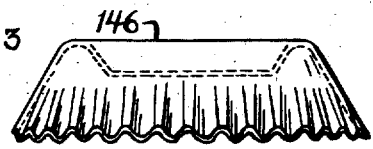
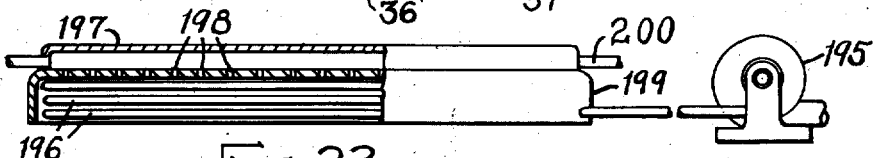
INVENTOR
Enoch T. Ferngren Patented June 14, 1938

2,120,328

UNITED STATES PATENT OFFICE 2,120,328

METHOD OF SHAPING SHEET MATERIAL

Enoch T. Ferngren, Toledo, Ohio, assignor, by mesne assignments, to Plax Corporation, Hartford, Conn., a corporation of Delaware Application January 31, 1933, Serial No. 654,374

16 Claims. (Cl. 18—56)

This invention relates to improvements in methods of shaping sheet material such as cups, crimped parts and articles such as "overall" caps for milk bottles from plastic sheet films of cellulosic composition such as Cellophane and various types of more or less fragile and more or less extensible plastic tissues and other sheet materials of different kinds, which may be manufactured from various dissimilar types of plastic or fibrous materials.

In providing such an article as a sanitary coverall milk bottle cap by the process herein shown, it is an object to provide the dairy industry and the consumer of bottled milk with a serviceable closure, which may readily be attached to a milk bottle by a heated clamping shoe, if the sheet material employed is such as to be softened by heat. Also a crimped or pleated cap may be provided which is held in position around the beaded edge of a milk bottle by means of a suitably attached band, rubber snap, or wire, if the sheet material used in making the cap is such as to be unaffected by heat or by a plasticizing agent at time of capping.

The method herein disclosed is not confined to the making of the articles mentioned, but may be employed in all its essential details in the making of blanks for various kinds of paper cups and dishes or in the making of similar articles, particularly drinking cups from regenerated cellulose or the like, the pleated blank formed being readily pressed into the finished article. Transparent drinking cup blanks produced by this process can have their edges reshaped or else bound by suitable fibrous or transparent plastic ribbons during their final shaping or thereafter.

Regenerated cellulose tissue and in fact all transparent sheet materials of cellulose origin are quite fragile, having a tendency to split or tear and otherwise are quite unsubstantial when handled in large sheets. The cutting out of a blank from such sheet stock is also a hazardous undertaking unless special precautions are taken to impart a certain measure of rigidity (normally not present) to such materials before attempting to cut out the required shapes. Also, most of these transparent sheet materials are more or less sensitive to a condition of heat and moisture under the influence of which they become more tenuous or ductile in a reshaping sense. The method and means herein disclosed are partly directed towards the securing of practical results in a fool proof way from regenerated cellulose and the like when reshaping such material into hollow objects to be used for various purposes.

In the reshaping by die-like forming means of cellulose derivative sheet stock, whether said stock be produced from a cellulose-acetate, a nitro-cellulose coated sheet or of viscose, it is essential that simultaneous contact on opposite sides at the same point or zone of the sheet stock by opposite shaping members be avoided as far as possible. For best results the tissue material should be entirely out of contact with the impressing and reshaping members except along one side or face at any one instant, and then only at the extreme opposite points of the cooperating shaping parts, so that the tissue or sheet film section in contact on one of its sides with such parts will be free to readjust itself simultaneously in several directions until all of the material acted on is brought into its final ultimate positions with relation to the shaping members.

During the reshaping of such material it is at times desirable to have the forming members maintained at a relatively low temperature and then to introduce steam between the sheet stock and forming member during the final free shaping of the cut blank, at least adjacent one of the forming members. This tends to condense the moisture along the faces of the cooler forming means or member on one side of the sheet, while the treatment otherwise will materially soften the sheet material as it undergoes its final shaping.

Following this procedure the sheet stock may be disengaged from one of the forming members, preferably by use of air pressure, and the formed article may then be carried in the other of the forming members and thereafter discharged therefrom at a suitable point as will hereinafter be further described.

Many types of temperature treatment may be employed, for instance, the upper series of forming members herein shown may be maintained at a slightly higher temperature than the softening point temperature of the plastic sheet stock or other material which is being impressed, stressed or drawn by the die members, while at the same time the lower forming member or die may be maintained at a much lower temperature to prevent or regulate by relative heat absorption in the lower die members excessive thinning out where the tissue material or sheet stock contacts with the projecting shaping parts of the lower die member.

In the practice of this process all types of colored pigments may be employed in the material used to give suitable colorations to such material. The die members if heated may be given a coating of a fluent paraffin compound preferably by spraying, although brushing may also be employed. In this way many kinds of paper stock may be made fairly water-proof, while otherwise being concurrently more easily reshaped into a desired form in the dies in the presence of a dry or a moist heated atmosphere. The finished article, of course, is cooled in the die directly it has attained its final shape and before it is ejected from either one of the die parts.

While in the illustrative embodiment to be described the die parts are used in the making of caps for milk bottles or nut cups and the like, it is to be understood that the invention is not limited to the exact details shown and hereinafter described, as it is evident that blanks of almost any shape can be cut from fragile materials, according to the process herein disclosed, and that variations in subsequent shaping of such blanks may be employed without departure from the present invention.

Square box-like articles may be formed and triangular, hexagonal and oblong, hollow articles may be produced merely by changes in the form of the coacting die members and their relationships during the movements of these members from their point of engagement with the sheet material or tissue through the succeeding stages of their movements until the article is released or ejected from the die members of the upper or lower series of such members presently to be described.

Many such articles may be reshaped into other forms by subsequent folding or pressing operations, or by the subsequent application of an external coating of a fluid plastic compound thereto, such as by dipping or spraying. Thus, relatively rigid light-weight containers may be ultimately produced. This last application of the process is valuable in the production of transparent film type articles, such as square cartons, first by shaping a transparent tissue into the required hollow form by means of apparatus as herein shown and then by dipping or spray-coating the articles so made to a desired thickness, thus building up laminated, two, three or four-ply structures, all of transparent cellulose derivative or other plastic materials. Articles which may be made in accordance with the present invention are disclosed in my copending application, Serial No. 629,696, filed August 20, 1932.

With regards to dipping liquids, it should be noted that it is not always necessary to employ solvents of the so called volatile character, as many plastics may be rendered fluent by heat, even without plasticizers or other softening agents. When regenerated cellulose or like sheet stock is employed in the forming of a hollow blank for a container which is subsequently built up for greater strength by the application of a coating liquid, the coating solution or dispersion can be produced, for example from a benzyl cellulose compound or a compound of cellulose acetate with a suitable plasticizer or solvents.

Many types of fibrous materials, of more or less tough sheet stock may, of course, be handled in the machines of the kind herein disclosed and many useful articles thereby produced. It is not always essential when pressing such fibrous material that it be advanced along with or between a series of dies as an entire sheet, as preliminary blank forms may be cut out in one machine and partly formed therein and thereafter introduced into the pressing dies of a second machine.

Several machines having differently organized die assemblies but otherwise organized and actuated in the same fashion as herein shown, with the exception of a complete blank cutting operation in the first unit, may be caused to operate tandem fashion on one continuously advancing sheet of paper or other suitable material, by which procedure many different primary and secondary or more complete forming operations by successive complemental die assemblies are made possible.

Hollow articles formed of two or more laminated layers of sheet material may be manufactured in a machine of the character shown. Also, several sheets of non-adhesive material may be operated on at the same time to produce a plurality of like articles in one pressing operation.

Suction may also be employed in the forming machine, particularly in the lower series of die members herein shown at the time of cutting of blanks and during the subsequent shaping thereof. By this expedient the certain kinds of sheet stock may be caused to enter and adhere and to draw and adjust themselves more readily to the cavity sections of the forming dies. This expedient of using variable air pressures is useful in the forming of many articles and drinking cup blanks on which the pleats can be flattened by coaction between a transfer element and the positive shaping die.

In the accompanying drawings, there is illustrated apparatus capable of performing the process of my present invention. In the drawings:

Figure 1 is a view principally in vertical section through the die assemblies and related parts;

Figs. 2 and 3 are fragmentary views principally in vertical section diagrammatically illustrating different steps in the movements of the dies toward one another and showing the sheet material in the process of formation;

Fig. 4 is a diagrammatic view principally in elevation showing the operation of a tractory-type or caterpillar pressing device;

Fig. 5 is a fragmentary sectional view taken substantially on the line 5—5 of Fig. 4;

Fig. 6 is a fragmentary view in perspective and partly in vertical section of the end portion of a die-carrying cross bar or supporting member used in the upper chain of the caterpillar pressing device of Figs. 4 and 5;

Fig. 8 is a fragmentary view partly in elevation and partly in vertical section on the line 8—8 of Fig. 7, showing the relationship of the supporting parts to the pressing and forming elements;

Fig. 9 is a fragmentary view partly in elevation and partly in vertical section of the apparatus showing how the die assemblies are located and acted upon by the controlling cam parts, rails and driving means;

Fig. 10 is a fragmentary plan view of the cross arms or supporting members which carry the lower die assemblies, also illustrating the location of the device for injecting steam, vapor, air, etc., under variable pressure into the dies;

Fig. 11 is a fragmentary view principally in horizontal section through one of the arms of the injection device;

Fig. 12 is a fragmentary view partly in side elevation and partly in vertical section of the injection device, the section being taken on the line 12—12 of Fig. 10;

Fig. 13 is a view partly in side elevation and partly in vertical section of the transfer device, showing how the formed articles may be successively removed from the dies of the upper series;

Fig. 14 is a fragmentary plan view with parts broken away and in horizontal section of one end portion of the transfer device;

Fig. 15 is a fragmentary detail view of certain mechanism forming a part of the transfer device, the operation thereof being illustrated in dotted lines;

Fig. 16 is a fragmentary view principally in elevation and with parts broken away and in vertical section of a portion of the transfer device, showing how articles such as milk bottle caps may be stacked or nested in tubes;

Fig. 17 is a fragmentary view in elevation of the vacuum and pressure tanks used for the machine, illustrating their relation to the transfer device;

Fig. 18 is a plan view with parts broken away and in horizontal section of the upper forming dies;

Figs. 19 and 20 illustrate diagrammatically different ways in which blanks may be cut from advancing sheet material;

Fig. 21 is an elevation of the receiving or entrance end of the upper and lower series of dies, their supporting parts and the drive transmission, several of the dies and other parts being broken away to reveal the ejector means operative on the upper die members, and the injection or suction device for the lower die members;

Fig. 22 is a fragmentary view principally in vertical section of the cooperating parts of the upper and lower dies, illustrating the relation of the telescopic and resilient supporting means for an upper die member when it is depressed into a lower die member;

Fig. 23 is a fragmentary view partly in vertical section and partly in elevation of a heat absorbing blowing and refrigerating means used for chilling and imparting rigidty to sheet plastic material or for chilling the die members;

Fig. 24 is a fragmentary perspective view showing a formed milk bottle cap placed on a bottle; and Figs. 25 and 26 are views in elevation and with a part of Fig. 25 broken away and in vertical section, illustrating different styles of caps, which may be formed from sheet material by the process of my invention.

Figure 7:
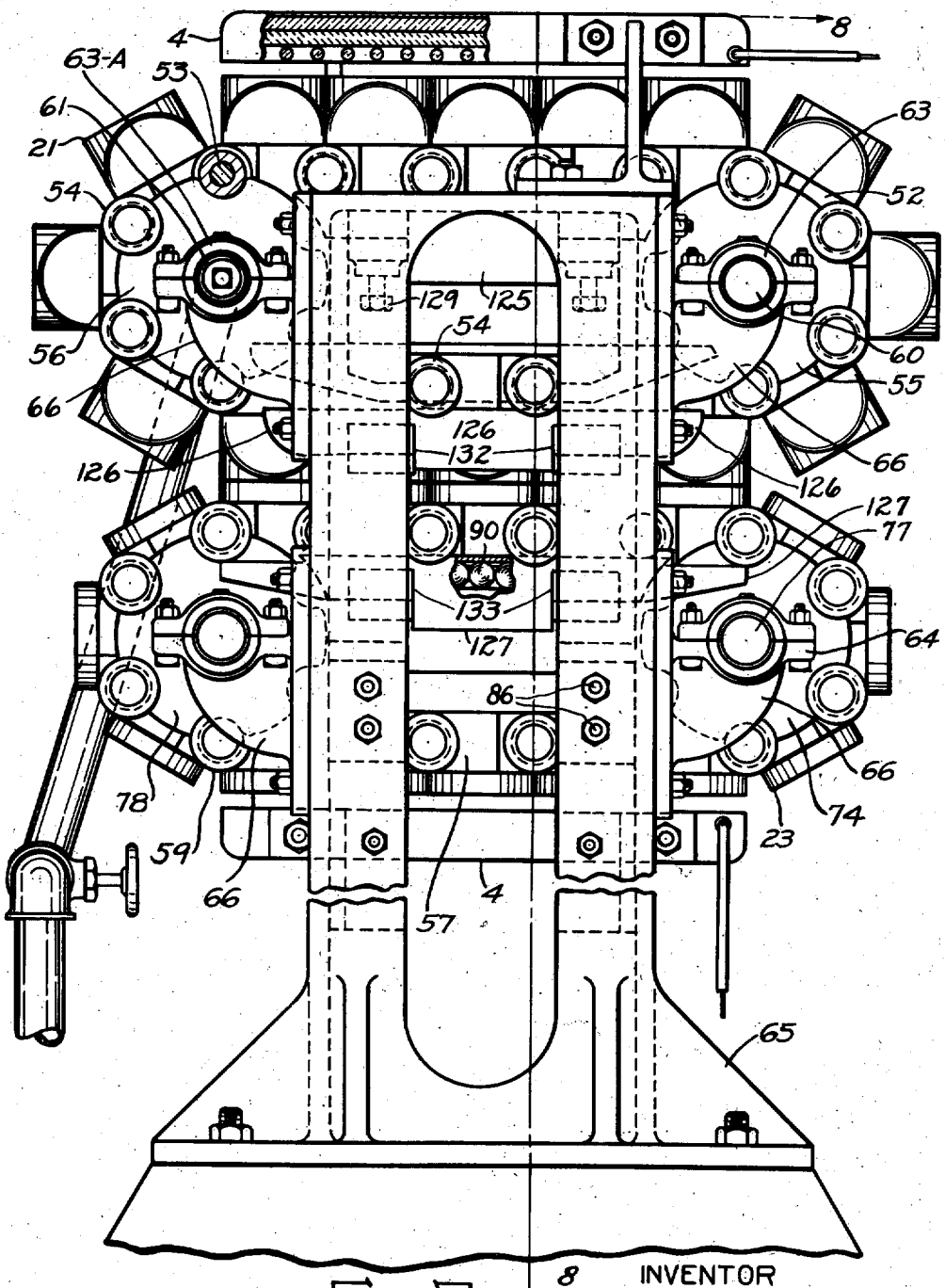
Fig. 7 is a side elevation with parts broken away and in vertical section of the entire forming machine indicating the location of the upper and lower forming dies at different points in their movements and while they are being heated or cooled.

The upper and lower die members 1 and 2 and their associated parts as shown in Figures 1, 2 and 4 are positioned, ready for operation on paper, film, or plastic tissue stock 3, Fig. 4. These die parts, and forming, cutting, stretching, treating and pressing elements, which as actuated by the mechanisms of the machine proper are progressively adapted, first, to clamp down and hold the tissue; second, to stretch the tissue which is to be cut at the point where it is to be exposed to the cutting edge, or to draw the stock into shape in part or completely before cutting; third, to cut the sheet successively into blanks of predetermined shape; and fourth, to form and draw each blank into the shape of the dies, if it is not previously drawn or shaped. The dies may be heated or cooled, oiled or paraffined, steamed or wetted, or used for chemical treatment, as conditions and the nature of the material require, in any suitable way, externally or internally, one form herein shown being an electric heating means 4, best shown in Figures 7 and 8. Any plastic material or sheet stock which may in any manner be effected by heat or thereby rendered soft and pliant, or which may require the removal of moisture therefrom, may be employed. Many materials within my invention are more readily conformed to the shape of the dies if heat is employed. Some materials may be permanently set to the shape of dies only by means of heat. Sheet stock which must be wet in order to be shaped as herein set forth, may be speedily dried by the application of heat from the dies and thus have a permanent shape imparted thereto. Dry steam may also be used and, of course, any cooling agencies. Suitable means may be used for applying pigments to the dies or paraffin or other coatings to the materials as may be required.

Each die 1 has a cover plate 5 attached thereto by means of the screws 6, Figures 1 and 22. This plate 5 is provided with a central hub portion 7, into which the lower threaded end 9 of a hollow shaft 8 is screwed. The hollow shaft 8 of each upper die assembly has a larger diameter rim edge 10 at its upper end which normally overlaps and rests on a shoulder 11 of a hollow shaft 12. A compression spring 13, which surrounds the shaft 8, is instrumental in maintaining this relationship and extends between the upper face of the hub portion 7 of the plate 5 and the lower end of the shaft 12, this spring being further compressible to act as a shock absorber during the downward movement of the shaft 12 to advance the die 1 into engagement with the lower die 2.

The shaft 12 of the upper die member is slidable in an associated hollow guiding standard 14 of a supporting member 15. The upper end of the shaft 12 is securely joined to a hollow hub part 16 of a depressing member 17, Figs. 5 and 22. Compression springs 18, which are shown as surrounding several of the standards 14, Figs. 1, 5, 8 and 22, normally serve to support the member 17 and all the upper die members in the position of the parts shown in Fig. 1, with the upper face of the die plates 5 touching the lower face of the member 15, the springs 18, when compressed, permitting the dies 1 to be moved downwardly when the member 17 is acted upon by sufficient compressing force or is given a positive downward movement in the direction of the lower dies as shown in Fig. 9.

The upper dies 1 are thus yieldingly supported from the member 15 and yieldingly connected to the depressing member 17, the springs 13 serving to cushion the downward thrust of the shafts 12 and to modify the amount of compressive force used during the reshaping or the formative dwell of the die members upon the material which is being shaped, see Figure 22.

Each upper die 1 has associated therewith a cylindrical cutting knife 19, which is vertically adjustable relative to the die by a threaded connection 20, so that the sheet material may be cut into blanks at the proper instant, before or after the lower end or the lowermost portion of the upper die contacts with or bears down against the material. It is essential that the cutting action of the knife 19 be adjustable to suit different materials or their conditions of rigidity, tendency to tear, yieldability and flexibility. For instance a relatively fragile, soft or extensible sheet tissue such as regenerated cellulose or the like must be impressed, tensioned or stretched taut before it is cut. This is accomplished by first engaging the tissue or sheet stock between the die members as shown in Figure 2 before it is cut or engaged by the cutting knife, after which the knife 19 may cut through the stock 3, or co-act with a cooperating shearing surface or edge 45 cleanly to cut the sheet, film or tissue stock.

The first portion of the upper die assembly to engage the sheet stock or tissue should normally be a cylindrical clamping member 21, which surrounds the knife and the die assembly, but is not strictly a part thereof, as it is largely independent of any movements given to the die proper. However, this sheet holding clamp is actuated from any pressure applied from the members 15 in a downward direction, which assists in clamping the tissue. The clamp member 21 is normally mounted upon the lower face of the member 15, by means of screws 22, Fig. 18, but may also have an individual vertically movable support and is so adjusted with relation to a cooperating clamp member 23 of the lower die that when the dies are brought opposite one another, the sheet stock will be instantly held by compressible elastic rubber facings 25 and 26, by means of which a cushion is formed at the edges 27 and 28, of the clamp parts.

The lower clamping member 23 has a V-shaped annular recess in its upper edge 28 into which the tapered portion of the upper edge or rubber part 25 will fit when the die assemblies are brought into closely fitting contact.

The upper die part 1 has an inner space 29, Fig. 1, which communicates with a passage 30 within the tube 10 and the hollow shaft 12. This passage acts as a conduit for air or other fluid, gases or liquid under suitable pressure and temperature, to be used if the sheet material calls for a specific treatment during the shaping operation in the dies. As herein shown these passages are used for delivering air under pressure into the molding cavity of the upper die member to effect delivery of the shaped article or to eject or free the article prior to delivery or to confine the article to either the upper or the lower die with which a similarly arranged delivery device may cooperate at any suitable point. The lower die members may function to deliver any type of article which is press-formed in the device, in which case air under pressure is communicated to all the dies which are mounted on the same cross arm or member 15 at suitable points in the path of the lower dies after the upper dies are withdrawn from contact therewith.

The air or fluid admitted to the enclosed space 29 within each upper die is released or forced out through two series of small orifices 31 and 32 arranged at suitable points in the walls 33 and 34 of the die 1, when direct treatment by fluid contact or pressure or action on sheet stock by gases or other media is desirable. Another purpose of these orifices in the die is to admit air under pressure between the exposed forming face of die and the inner surface of the flat sheet material that has been shaped therein, the air being admitted at time of ejection or delivery of a completed article from the forming member 1, especially when a transfer device is employed, see Figure 13, or as otherwise may be the case, directly to a receiving tube, a capping device, or onto the neck of a bottle.

With reference to the direct delivery of a milk bottle cap or any other cap to a bottle neck, no transfer device will be needed if the arrangement of the die parts is such that the lower dies drop away from the upper dies while the upper dies are still continuing to advance along their horizontal path for a short distance. This provides clearance space for free downward ejection of the caps or articles from the lower dies and their retention by the upper dies as the lower dies are being inverted to start on their return travel to meet the upper dies.

The die 2 has a hollow interior space 35, Fig. 1, communicating with an enclosed space 36, Figs. 1 and 9, of a lower supporting member 37. When air or other fluid under pressure is admitted to the spaces 36 and 35, it will pass through two series of orifices 38 and 39 to the outside of the wall 40 of the lower die 2 and will disengage the formed sheet stock therefrom. These conduits may also serve to admit water, steam, solvent, vapor, paraffin or gases for chemical or other treatment of the articles.

A raised hub 41 of the supporting member 37 has an inner threaded face 42, Fig. 1, for holding the threaded shank 43 of the die 2. This hub also has an outer threaded wall portion 44 for adjustably holding the lower clamping member 23 in a desired position relative to the upper clamping member 21 to insure that the sheet stock will be securely gripped in the V-shaped groove 46 between the rubber coated edge parts 25 and 26 when the respective die assemblies are caused to approach each other.

The extreme inner edge 45 of the clamping member 23 should preferably be free from any rubber coating, so that this edge may coact with the knife 19 to cut out the blanks from the sheet stock. The members 15 are shaped to afford clearance spaces 51 near their outer ends for the reception of rollers 48, which are mounted in bearings 49 at the outer ends of the depressing member 17.

The rollers 48, of which one is provided at each end of the member 17, are advanced into contact with fixed cam rails 50 during the engagement period of the dies 1 and 2. The rails 50 are so shaped that the rollers 48 at the spring-supported opposite ends of the member 17, will together with that member be depressed or moved a like distance toward the member 15, the clearance spaces 51 at the opposite ends of the member 15 permitting this displacing movement, Figs. 5 to 9 inclusive.

The cam rails 50, of which two are provided, function to depress the opposite ends of the depressing members 17 an equal distance vertically, while these members are carried onward by the supporting members 15, which are moved horizontally at this particular time. During this operation, the springs 18 and 13 are compressed and the upper die assemblies are actuated by the depressing action of the rails 50 on the members 17 to tension, cut and shape the sheet material.

All the members 15 are pivotally connected at their opposite or outer ends, at two points, by means of link-shaped portions 52 of the members and pins 53, each link being connected to the succeeding and following link of the adjacent members 15 to form an endless chain of these members. Each of the pins 53 also functions to support a roller 54 at its outer end adjacent to the outside face of each link 52, the rollers being held to the pins by means of heads or flanges thereon.

As shown in the diagrammatic layout, Fig. 4, the respective links 52 at the ends of the members 15 of the upper series of dies form a continuous link chain belt, which is advanced by means of sprocket wheels 55 and 56, the arrangement being duplicated at the opposite ends of the members 15. In this way, a rigid reliable construction is provided that permits of a continuous movement of all the die parts without any shifting or weaving.

The hollow supporting members 37 for the lower die members are provided with links 57 connected by pins 58, each of which carries a roller 59. The distance between pivot points for the members 37 of the lower link assembly is the same as that of the upper link assembly, so that the lower dies 2 will be brought successively into registry with the upper dies 1 along their cooperative faces and edge parts. The lower link assembly is mounted for movement about sprocket wheels 74 and 78.

Machines of this type may have any suitable number of links. The number of die-carrying upper and lower members 15 and 37, which are in engagement, may be considerably increased. The drawings show only three of these die-carrying members coming simultaneously under pressure actuation from the depressing rails 50. By adding more die-carrying members, a longer period of contact may be afforded between each series of dies and the material that is being shaped. The accompanying drawings show the minimum number in order to bring out the details of construction in proper scale and as clearly as possible. The number of die-carrying members simultaneously acted upon by the cam rails 50 during the horizontal run of engagement of the cooperating dies 1 and 2 is preferably not less than five, this, of course, increasing the length of the respective chain drives. The addition of a larger number of supporting members and the additional dies thereon in no way impairs or hinders the operation of the various mechanisms of the device.

The sprocket wheels 55 and 74 are carried by hollow shafts 60 and 77 respectively, which are rotatable in bearings 63 and 64, these bearings being respectively supported from frame 65 of the machine by the provision of projecting arms or brackets 66.

The shaft 60 is rotated by means of a worm wheel 67 that is driven by a worm 68, the worm 68 being mounted on a vertical shaft 69, which is driven by a suitable source of power shown as comprising a motor 70, a speed reducing means 71 and a gear train including bevel gears 72 and 73. The arrangement is such that the same speed is imparted in the opposite direction to the sprocket wheels 74 of the lower die assembly chain drive by means of a worm 75 on the shaft 69 and a worm wheel 76, which is mounted on the outer end of the shaft 77 of the lower chain drive.

The opposite sprocket wheels 78, which engage the rollers 59 of the lower die assembly are normally idlers and are driven by the motion of the links 57. The same is true of the sprocket wheels 56 of the upper die assembly, which are normally rotated by the movement of the links 52.

A stationary pipe 61, Figs. 4, 7 and 9, is surrounded by a cylindrical casing 79, to the opposite ends of which the sprocket wheels 56 are secured, the casing 79 being supported by and rotatable in bearings 63ᴬ. The casing 79 carries nozzles 80, Figs. 9 and 21, which are adapted to register with the upper ends of the hollow shafts 12 of the upper die assemblies, as shown in Fig. 9. As the hollow shafts 12 are moved around the pipe 61 by the sprocket wheels 56, each nozzle 80 is brought into registry with an opening 81 in the pipe 61 from which it receives a discharge of compressed air. This air is transmitted from the pipe 61, through the nozzle 80 and the passage 30, Fig. 1, into the space 29 of the upper die 1 and thence through the passages or perforations 31 and 32 to the outside face of the die, with the effect of immediately dislodging the shaped material therefrom. This dislodged material is then received by a suction head of a transfer mechanism, as will be more fully hereinafter described.

The hollow supporting members 37, which sustain the greater percentage of the downward pressure of the upper die members 1 against the corresponding lower die members 2 during the association of the rollers 48 with the cam rails 50, would under certain conditions of length and if supporting a large number of dies, be inclined to bend downwardly intermediate their supported ends. To overcome this difficulty, all the arms 37 are also supported centrally by means of parallel continuous ball races 92, Figs. 8 and 9, that are located centrally within the lower chain drive circuit and supported by means of cross bars 83. The cross bars 83 are held to the webs 85 of the main supporting frame 65 by means of brackets 84 and bolts 86, Fig. 8.

Each ball race 92 is formed in two separate parts 87 and 88, into which grooves have been cut, as shown in Figs. 8 and 21. The lower side of each arm 37 is provided with a suitable recess or groove 91, the contact faces of which advance the balls 90 in the races 92. The parts 87 and 88 are suitably received in socket portions of the cross bars 83 and may be secured in position by bolts as shown best in Fig. 8.

The hollow supporting members 37 receive a supply of compressed air from a series of nozzles 93, Figs. 8, 10, 11, 12 and 21, which are successively in continuous engagement with receiving openings 94 located in the lower faces of the hollow supporting members 37 and beneath the cam rails 50 and where the upper die members are still in engagement with the lower ones. The object is to create a sufficient pressure between the sheet material and the outer faces of the lower die members, so that a pressed object will normally be released from the lower die the instant the associated upper die is elevated by the action of the springs 18. The air admitted under pressure from the space 36 into the separate space 35 of each lower die member 2 then flows outwardly through the perforations 38 and 39, thus positively preventing adhesion of the sheet material to the lower die or the creation of a vacuum therebetween and thus positively causing the sheet article to be retained by the upper die at the instant of separation thereof from the lower die.

As best shown in Figs. 8, 10, 11 and 12, the nozzles 93 are carried by arms 95, which are extensions from a central slip-over hood 96. The hood 96 is rotatably mounted on a hollow standard 97 by means of a depending pin portion 98 of the hood 96, which passes through a hole 100 in the upper wall of the standard 97 and by which the hood part is mounted for rotation about the standard while being held thereto by a nut 99 threaded on the pin 98 and separated from the upper wall of the standard 97 by a washer 101.

The hollow standard 97 is mounted in a U-shaped bearing 102 having hubs 103 and flanges 104, the latter of which are secured to the cross bar 83 by bolts 105. The standard 97 is provided with a shaft 106 at its lower end, which is slidable in the hubs 103 of the bearing 102 and is urged to the position shown in Fig. 12 by a compression spring 108 extending between one arm of the bearing 102 and the standard 97. The parts are shown in Fig. 12 in the position they occupy when one of the nozzles 93 is going into or out of engagement with an opening 94 of a supporting member 37.

As shown in Figs. 10 and 21, one of the nozzles 93 is in position to engage an opening 94 while another nozzle is just going out of engagement with another opening 94 of an adjacent supporting member 37, these members being continuously moved. During each engaging period of the tapered engaging portion 107 of the nozzle 93 with the opening 94, the standard 97 is caused to reciprocate in a horizontal plane, the shaft 106 serving to retain the standard 97 in a rigid upright position, while a reciprocating motion is imparted thereto in the bearing 102. The spring 108 quickly moves the member 97 in one direction, while the supporting members 37 cause a movement thereof in the opposite direction against the spring as the nozzle is moved by the arms 37 in a straight line along the groove 109, Fig. 10.

Each nozzle 93 has a freely rotatable head portion 110 suitably secured to a vertically reciprocable portion 111, which is provided with a flange member 112 at its lower end. The flange member 112 serves as a retainer for a ball 113. A compression spring 114 extending between the flange member 112 and the ring-shaped end of the arm 95 normally keeps the nozzle body portions 111 and 110 in their lower positions; while the cam groove in plate 115 functions to raise the nozzle body portions 110, 111 and 112 at a predetermined point to align and thrust the tapered end 107 thereof into the tapered opening 94 of the member 37. At this time a laterally open chamber 116 in the nozzle portion 111 is in alignment with a passage 117 of the arm 95, which then moves into alignment with a lateral opening 119 of a space or bore 118 of the standard 97, the movement being progressive and so arranged that the full registration of the openings in these parts will occur slightly before the shaft 12 of each upper die assembly is elevated by the expansion of the springs 18.

At the time of such registration, compressed air flows from the space 118 through the passage 117 and thence upwardly into the space 36 of the supporting member 37 by way of a passage 120 in the head of the nozzle.

Compressed air may be conducted to the member 97 through a pipe 121 and a flexible hose 122, Fig. 12, but may also be admitted from a flexible hose 123 through a side coupling 124, as shown in Fig. 8. By this injection device, of which two separate sets should be used, one at each end of the supporting members 37, a pressure considerably above atmospheric may be established inside the space 35 of each lower die 2 for the release of a formed object therefrom. This mechanism may also be used for supplying steam, water or other fluids for treatment of sheet stock. When so employed, two separate cooperating devices are located to operate on the dies as the sheet material is being cut into blanks. As each nozzle 93 is inserted into the corresponding opening 94 and is moved by the supporting member 37 along the straight path defined by the groove 109, the ball 113 at the lower end of the nozzle eventually arrives at the point of cam plate 115 where the cam groove 109 therein recedes downwardly. At this time, the spring 114 will expand, forcing the head 110 of the nozzle 93 out of the opening 94 of the supporting member 37, after which the arm 95 carrying the nozzle just discussed proceeds on its rotational journey around the standard 97.

The parts are so proportioned that this release of the nozzle occurs as the next succeeding nozzle head 110 enters the opening 94 of the next succeeding supporting member 37. The location of each air pressure distributing device should be at the sides of the ball races 92 and at that end of the lower die circuit where the dies 1 and 2 are directly below those parts of the pressure rails 50 where the downward pressure imparted by said rails to the upper dies is nearly completed, so that ample compression will be established in the spaces 35 and along all the lower die faces 40 before the upper dies are permitted to recede upwardly therefrom by the upward slope of the pressure rails 50.

All the die-carrying supporting members 15 are supported during their horizontal runs by upper rails 125 and lower rails 126.

The lower die-supporting members 37 are likewise supported by rails 127 and 128, so that all the dies of the upper and lower series may register without any deviation as they are brought together and simultaneously advanced in the same direction.

The lower rails 126 for the upper series of dies should be so shaped along their upper edges as to cause a slight closing in toward one another of the clamping members 21 and 23. The rails 127 for the lower series of dies may likewise have a slight upward curve to cause an intimate relationship of the sheet-gripping parts 25 and 26 prior to the downward thrust on the rollers 48 of the depressing members 17 by the rails 50. The rails 50, when exerting their downward pressure on the depressing members 17 and the springs 18, thus also function within limits to cause the clamping parts 21 and 23 to approach each other. All the rail parts may be adjusted vertically by suitable means comprising screws 129 and 130. Other expedients, such as wedges, may be used in the adjustment of the rails in respect to their supporting arms 131, 132, 133 and 134, Fig. 8. By these expedients the exact amount of contact pressure may be readily established between the clamping members 21 and 23 as they are brought into alignment during the rotation of the companion plural driving sprockets 55 and 74.

All the sprockets used may be driven in unison, if this is required, and may function to impart intermittent as well as continuous movement to the links and dies.

In operation, a sheet of suitable material is supplied in the form of a roll 136, Fig. 4, from which the sheet is fed onwardly between the upper and lower series of clamps 21 and 23, which engage the sheet as they approach one another and by which means the sheet is advanced in the direction in which the series of dies 1 and 2 are being moved.

As the assembled means for acting upon the sheet stock, Fig. 1, are being moved horizontally with the sheet material 3, the coacting die members operate to stretch, impress, tension and shape the clamped sections of the sheet, while the knives 19 cut out blank sections 137 from the sheet stock. These sections 137, because of the action thereon of the die members 1 and 2, have become definitely aligned with the projecting portions of the dies, so that, when they are cut free, each partly shaped blank portion or section will remain in correct position relative to the dies for subsequent operations.

In the case of milk bottle caps, the cut-out blanks 137 are circular, as indicated in Figs. 19 and 20, and the successive series of devices with blank cutting knives may be so located that the perforations through the sheet will occur in alignment, as shown in Fig. 19, or in staggered relation to one another, as shown in Fig. 20. The latter method is more economical since a greater number of caps may be produced per yard of material consumed. To accomplish this, the die-carrying supporting members 15 and 37 are made narrower so that the respective clamping parts may be brought closer together and arranged in staggered relation to one another.

Rolls 138 and 139 act to direct the flat sheet stock 3 into its horizontal run, Figure 4, and assist in keeping the sheet material in a taut condition, considered as a whole, pending and during the action thereon of the dies. After the sheet stock has been acted on by the respective knives 19 in the forming means, the perforated skeleton of the sheet is wound up on a take-up spool 140. This member is preferably driven by means of a slip-friction clutch in a synchronized fashion with respect to the constantly growing diameter of the spool and at a peripheral speed equal to the lineal speed of the sheet.

In order to maintain this condition the actual speed of rotation of the winding spool 140 is gradually reduced as the roll of sheet stock thereon increases in diameter. Details of this mechanism are not shown as they are not considered as being a part of this invention and any well known slip clutch drive may be used.

The actual performance of the dies 1 and 2 on the sheet stock is partly indicated in Figs. 2 and 3. As shown in Fig. 2, the first forming action on the sheet stock occurs as the blank section 137 held between the parts 21 and 23 is exposed to the downward thrust of the wall portion 34 of the die 1 on one side thereof, while the opposite side of the blank encounters the rigid resistance of an annular surface portion 144 of the die member 2, both of these material-contact die portions being pushed in opposite directions before the blank section is cut free from the sheet by the action of the knife 19.

If the sheet material possesses a fair degree of plastic extensibility, the knife 19 may be properly located about as shown in Figure 3. On the other hand, if the sheet tissue should be of relatively rigid material the position of knife 19 should be as indicated in Figure 2. Many materials can be considerably softened by the application of steam, in which case the die member 2 should be kept at a relatively low temperature prior to the ejection of steam from the small orifices 38 and 39 thereof, which will then cause a condensation of vapor on the lower side of the blank 137 and on the exterior surface 40 of the die. This moisture will be quickly absorbed by cellulosic or other types of more or less porous or absorptive materials with the result that varying degrees of wilting occurs, which renders such materials quite pliable to reshaping with some degree of stretching. If the upper die member 1 is maintained at a suitable elevated temperature relative to the material to be acted upon, a permanent set may be given even to very rigid fibrous stock.

If the material to be acted upon in the dies is of the rigid kind, the blank may be cut immediately the clamping action has taken place, in which case the knife 19 should be located as shown in Figure 1. Also steam may be immediately released from the orifices 38 and 39 to assist in producing a pliable condition in such material.

Stretching of the sheet blank 137, as shown in Figure 2, is useful when cutting blanks from such materials known commercially as "Cellophane", "Kodapak", also gelatine or casein base tissues or wrapping materials, the stretching of the sheet blank close to the clamping point enabling clean cutting without tearing.

In Fig. 3, there is shown two progressive stages during the final shaping of the blank after it has been severed from the sheet, the left hand portion of the figure showing the relation of the rigid surfaces of the die members and indicating how the material is drawn or is being moved by the projecting spaced die surface portions 34 and 143 just before the upper die has reached its final position relative to the lower die. The right hand portion of Fig. 3 shows the final relationship of the dies when the operation is brought to a stop under the resilient pressure action.

Many sheet materials are quite fragile in handling, particularly when being reshaped under such forming operations as would require a thinning out of the body of the sheet material. To avoid any possibility of rupture and of tearing during the shaping of such materials according to the present process, the die parts are so related to one another that the sheet blank will have contact on only one face thereof with a rigid surface of the die members at any one point acted upon by said members, for which reason a clearance space is provided between such surfaces as 141 of the upper die and 142 of the lower die.

Such spacing is provided at all points where interentrant parts of opposite cooperating dies are caused to operate in opposite directions on the sheet material, the result being that the material is free to adjust itself in several directions at the same time while it is being stretched, extended in body, or bodily moved into final position as determined by the most prominent projecting portions of the dies. As indicated in Figure 2, while the projecting portions 143 and 144, are moving a portion of the tissue in the clearance space provided between the side faces 141 and 142, the contact of the rigid points, on the opposite sides of the tissue, are spaced apart and each is active on one side only of the sheet stock, which thus has a chance to stretch and to adjust itself without being ruptured or structurally weakened. In this connection, a temporary increase in toughness or plasticity of the material is induced by various agents such as heat, gases or fluids, and is a valuable adjunct as above set forth.

The outer toothed sections of the dies are likewise spaced from one another in staggered relation, so that the sheet stock is practically drawn into pleats by the movement in opposite directions thereagainst of the outer solid surface portions of the teeth of the dies, the sheet material being free in the spaces between the projecting portions until the dies are in final position. At that time contact preferably should occur along the more extended surface portions of the dies, as for instance, between surface 33 of the upper die and the face 40 of the lower die, the tissue or sheet stock portion 145 being practically freely suspended as between points 143 and 144.

This space allowance between the forming means, not only allows freedom to the material so that it can not be pinched between co-active shaping parts, but also permits the handling of two or more layers or thicknesses of sheet material during the entire operation of blanking out, shaping and also of other treating. Thus for instance, a thin sheet of casein or a gelatin composition may be run through the machine in the same manner as a sheet of "Cellophane".

When transparent sheet materials of the kind mentioned in the preceding paragraph are simultaneously advanced from several sources or from different spools and brought between the upper and lower series of advancing blank clamping devices and a plural layer blank area is cut therefrom and progressively acted upon by the dies in the presence of a moist atmosphere which is at a lower temperature than the dies, which normally should be heated, a temporary softening occurs which causes the layers of the several sheets to gum or bind together into a practically cohesive body as the forming is completed under slight pressure of the opposite die elements.

Layers or sheets of nitro-cellulose, cellulose acetate, benzyl cellulose or other water-proof sheet materials may be operated upon, if in the manufacture of such sheets sufficient plasticizing agents or gummy materials are incorporated with the cellulose plastic materials. Such sheet materials may then be rendered soft or adhesive by heating or by exposure to solvent vapors during the shaping action. Layers of such sheet materials may likewise be laminated, but preferably in such an operation, the forming tools or dies should normally be at a lower temperature than the material, and by contrast the atmosphere or air used or injected into the dies should be dry and heated, independent of and with or without any softening solvent vapor component in such air or atmosphere.

Heated dies or molds are sufficient for the reshaping of many kinds of wetted or dry sheet material, but at the time of separation from the dies of sheet stock formed therein the removal of the finished articles is facilitated by the use of compressed air which has been cooled before it is used. The arrangement shown in Figs. 13 and 16 illustrate how compressed air is used to eject a shaped cap 146 from the die 1, while vacuum action is operative or caused to be operative through a receiving head 147, to effect a quick transfer of the pressed article from the die.

The principal utility of the transfer device shown in Figs. 13 to 17 is to remove and carry light weight, fragile tissue or film objects from the dies 1 to a position where they are nested or packed automatically into containers or tubes 149. These objects can be delivered, nested and packed in open form without distorting their shape.

The transfer device generally indicated at 148 comprises a series of tubular radially movable arms 150, the inner ends 151 of which are slidably mounted in a plurality of successive series of radial bores or hollow hub extensions 152, which are arranged lengthwise of a revoluble casing 153. The casing 153 is arranged to be revolved around a stationary two-compartment air conducting member 154, by means of a shaft extension 155, mounted in bearings 156, only one of which is shown, Fig. 16.

Each series of tubular arms 150 extending from the casing 153 is shown integral with a channel-shaped connecting bar 157. Each of these bars 157, of which six are shown, is slidably supported at its outer housing-shaped ends 158, Fig. 14, in guides 159, so that all the arms 150 of a series may be simultaneously moved outwardly or inwardly in the radial hub extensions 152. The rollers 160, of which one is provided at each housing end 158 of the bars 157, act to move the bars 157 radially inwardly, compressing springs 161, which extend between the face 162 of the casing 153 and the bar 157, when the rollers are moved inwardly by contact with or by being advanced along inwardly curved portions of cam rails 164. The springs 161 tend to move the bars 157 outwardly when said bars are freed for this movement by the cam rails 164 or other confining cam members.

Each bar 157 carries hinged thereto a bracket structure 165, to which is secured a series of receiving heads 147. Each head 147 is connected to the outer end of the tubular arms 150 by means of a nipple 166 and a rubber sleeve 167, thus providing a flexible hollow joint between each head 147 and the associated tubular arm 150. The head 147 may, therefore, be tilted at an angle when going into registry with the continuously advancing die 1 of the upper series of dies when removing or receiving a formed object therefrom.

The tilting operation of a series of the heads 147 is accomplished in unison by means of two crank members 168, which are secured to and rigid with the bracket 165 adjacent to the hinge points 169 thereof at the ends of the bracket. Rollers 170 at the outer ends of the cranks 168 come into periodic engagement with cam tracks 171, one of which is arranged at each end of the bracket, as indicated in Figs. 13 and 14. In this way, the bracket 165 is tilted progressively during the rotation of the casing 153 to bring the heads 147 into registry with the dies 1.

Prior to the tilting period of each bracket 165 and the series of heads 147 associated therewith, the roller 160 of the associated bar 157 is advanced by the rotation of the casing 153 to a point beyond the limit of the rail 164, thus permitting the expansion of the springs 161. These springs, when thus released from confinement, will thrust the channel bars 157 outwardly, thereby causing the ends 158 thereof to move radially outwardly along the guides 159 and also moving the tubes 150 and the heads 147 radially outwardly relative to the casing 153.

The actual registrative approach of heads 147 to the dies 1 may be considered as having several components of motion, as during the tilting of the bracket 165 by the combined operation of the cranks 168, the rollers 170 and the cams 171, the springs 161 are slightly extended, thus providing a combined rotational and radial motion for the heads 147.

At this instant in the continuous movement of the die-carrying link belt and the rotary transfer device, when the alignment of the heads 147 of the dies 1 is as shown in Fig. 13, suction is applied from compartment 172 in the member 154 through a passage 173 and ducts 174. At this time, a port opening 175 of the air conducting member 154 is in full registry with the hollow hub extension 152, thus causing an immediate adherence of a completed cap 146 to a receiving form 176 forming part of the head 147.

As this is being accomplished, the rollers 160 at the outer faces 177, Fig. 14, of the housing ends 158 of the bar 157 are brought into contact with the faces 178 of movable cam rail parts 179, which are hinged at points 180 to the cam rails 164. While the parts are thus positioned, the movable cam parts 179 are moved radially inwardly or in a direction toward the casing 153 by rotary cam members 181. The movement of each rotary member 181 is relatively rapid with the result that the bar 157, the tube 150 and the receiving head 147 are immediately moved inwardly toward the casing 153. Thus, the head 147 is almost instantly removed from the proximity of the die member 1, so that clearance will be provided between the coacting parts as they proceed on their rotational paths.

During the rotation of the several arms and heads 147 from their receiving position to the point of delivery, the hollow hub extension 152 and the passage 173 of each head 147 is opened to suction at two consecutive points by means of small port openings 182 and 183 in the stationary air conducting member 154, so that the cap may be retained on the form 176 until it arrives at the point of ejection from the head 147, which should be vertically downward.

As shown in Figs. 13 and 16, the interior of the hollow hub extension 152 may also communicate with a compressed air conduit 184 forming a part of the member 154 as the casing 153 moves the opening of the hub extension past the orificial outlet thereof. At this time compressed air passes through the tube 150 and ducts 174, thereby releasing and forcibly urging the cap downwardly into the receiving tube 149. Because of this form of delivery of the cap 146 from the head 147, the cap will retain itself in a horizontal position while moving vertically downwardly against the air column in the tube 149 until it settles into the preceding cap within the tube.

The movements of all the mechanisms connected with each series of heads 147 will be alike at all points of operation. A tank 186 serves as a container for compressed air, while a tank 187 is connected with a suitable air exhausting apparatus. A conduit 188 forms a suction passage for the air withdrawn through the heads 147. A pipe 189 is connected to the conduit 184 for the delivery of compressed air thereto.

Each rotary cam 181 is actuated by a pinion 190, which is driven by a gear 191. Each gear 191 is keyed to the shaft 155, as shown at 192, and is rotated at the same speed as the casing 153, the relation being such that the cams 181 will accurately operate at the required instant to move the associated cam members 179 against the rollers 160.

If the article formed should be a paraffined blank for a drinking cup with pleated side walls, and it should be desired to deliver the article with all the pleats flattened out to provide a uniform, substantially cylindrical body, the die 1 should preferably consist of a plunger having a shape like an inverted truncated cone with a smooth exterior, or at least without projecting ridges which should be classified as such.

The die 2 for such an operation should consist of a downwardly tapered cavity having a series of side wall corrugations or ridges to form the pleats. In such a case with heated and paraffined or otherwise coated dies, vacuum should be employed along the deepest recesses or reentrant spaces between the corrugations or ridges in the die 2 at the instant of cutting the blank to draw and distribute the sheet blank of paper or of transparent plastic material into the side cavities between the ridges of the die 2, while the plunger of the die 1 moves the blank body as a whole along its center portion to the full depth of the main center cavity in the die 2.

In order to provide an effective vacuum action, the pipe 122, Fig. 12, should be connected to the vacuum tank 187, by which expedient the air can be evacuated from the spaces 35 of the lower molding elements or dies 2 and from the space 36 within the supporting member 37. The procedure is that the successive nozzles 93 are caused to register with the openings 94 of successive cross arms or supporting members 37 for the withdrawal of air from the spaces 36 through the passages 120 and 117. This will result in the creation of a positive pressure on the upper side of the tissue or sheet blank as it is being cut from the sheet body because of the rapid evacuation of air from the cavities of the die 2 through the orifices or passages 38 and 39. This will cause the sheet material of the cut blank closely to follow and dip into the cavities of the die 2 as the air pressure within such cavities is reduced due to the suction action from the chambers 35 and 36, the passages 120 and 117 and the conduit 122. At the same time the die 1 is acting mechanically to form the center portion of the blank, which forms the normally raised bottom portion of a drinking cup.

When a drinking cup blank, thus formed, is released from the die 2 or the lower forming member and caused to follow the upper pressing element by means of the application of air pressure between the exterior surfaces of the lower mold member and the sheet stock, the paraffin absorbed by the paper material along the folds has a tendency to set due to the chilling action of the air which is now injected to the mold cavities by a second set of injection devices as above set forth.

As the blank is blown against the upper forming member and thus lifted out of the lower one as the cooperating forming means or dies separate, the pleats on the blank body are readily flattened down on the projecting portion of the upper forming member. The receiving cavity portion of the transfer head 147 corresponds generally to the exterior shape of the upper die member. As the cavity in the member 147 is advanced closely to surround the projecting section of the article or such section is brought forward to meet and engage the cylindrical cavity in the head 147, the pleats will progressively flatten down and retain such shape particularly if cold air under pressure is then caused to force the cup blank away from the upper forming member or die at the instant vacuum is employed through the transfer head 147. An almost completely finished drinking cup body or hollow substantially cylindrical vessel can thus be formed, which is then ejected and nested as heretofore described.

It should be noted that the cylindrical wall portion 193 of the transfer head 147 has a rubber coated edge 194 to effect good sealing contact without marring the surface finish of the die 1.

With regards to the size of the sprockets shown, it is normally preferable to use larger diameter sprocket wheels, so as thereby to promote a smoothness in the continuous motion of the links.

The invention in its narrower aspects, as concerned with the making of articles from flat sheet materials, deals with procedures of handling, treating and shaping sheet products of different body structure, but of relatively firm makeup, or such fibrous or plastic sheet materials, which are normally only slightly extensible.

Aside from the advantages which the invention has when dealing with paper, regenerated cellulose and the like, the invention also covers another embodiment, that is, the making of hollow objects or articles from specially compounded plastic sheet materials. These materials possess a greater inherent amount of extensibility but in some cases they must be treated and even changed in their nature while being operated upon in dies or molding elements in order to provide an easier shaping or flowing quality. If they do have the necessary viscosity and extensibility, for example, if they are natural or synthetic thermo-setting gums or condensation products they may be cured, vulcanized or otherwise treated to effect desired chemical reactions in order to give proper rigidity, flexibility, density and other qualities or properties to the final article.

Dishes and the like may of course be readily formed from paper without any pleating of the brim or side walls. When pressing paper dishes both the upper and lower series of forming means or dies should normally be heated, and the paper stock sprayed with a suitable quantity of water just before it is clamped and perforated. The pressing or shaping operation may occur at the same time or thereafter, but the form-setting period of the dies should continue for a time sufficient to expel the greater percentage of the water from the shaped paper stock. At this time, vacuum applied to the vacuum action in the lower mold element or die is advantageous in removing steam or moist atmosphere from the molds or dies.

In this connection, the suction-induced flow of air in the mold elements or dies is of practical utility in removing excess moisture from those freely suspended portions of the paper stock, which are held between opposite walls of the molding elements and which portions are so located as to be out of direct contact with the walls of either the upper or the lower dies.

With relation to thermo-setting materials, many different shapes of smooth-surfaced translucent and/or colored dishes, cups and the like may also be formed from nearly pure sheeted rubber gum compounds. In such a case refrigerating elements may be located relatively close to one or both sides of the plastic rubber sheet to give it a temporary condition of hardness as the sheet is being moved between the clamping members of the upper and lower series of dies, Fig. 23.

The cut blank portion of the rubber compound can be readily drawn and shaped between heated dies, and if properly compounded, will have sufficient elasticity and fluidity to distribute itself in uniform thickness of wall section between the opposing faces of the dies during the initial association with said elements from which considerable heat will radiate into the previously chilled rubber compound, after which, when subjected to further heating, vulcanization will proceed and the material will attain the required degree of rigidity while retained between the dies.

Addition of fillers, such as different fibres and many other materials will make for great economy in the use of rubber as is well known in the art.

With reference to the clamping means 21 and 23, the resilient clamping edges or rubber coating on said edges should be eliminated in all operations where the heating would destroy the resiliency thereof and when operating on sheet material which would have a tendency to adhere to the rubber.

When operating with sheet materials of the thermo-setting type, which require a long period of heating to impart the required degrees of hardness, the number of successive die carrying arms should be considerably increased, to provide a longer period of association between the dies along the active horizontal run and thus a longer period of pressure and heat penetration through the material. In this connection, treating agents such as heated gas, steam or air under pressure and either hot or cold can be used to advantage on many kinds of materials which are cured while exposed to elevated temperatures and pressures. For such operation, several consecutive injection devices of the type shown in Figs. 10 to 12 may be caused to operate successively on the same die of the lower series during its horizontal run.

In regard to the making of hollow articles from raw rubber sheeting or the like, extruded or calendered, unless such sheeting has been partly vulcanized before use and thus changed in its nature, the invention consists of the herein described treatment and the maintenance of a continuing pressure while the article is being carried through a heated zone and forward to the point of delivery, where it is ejected by means of low temperature air under pressure and removed from the pressing die by means of a transfer device where suction is employed, and from which it is nested in any suitable fashion, not necessarily including the step of a positive discharge from the transfer means by the use of compressed air, unless the article be of a very light weight.

Compounded rubber sheeting, whether provided with fabric reinforcement or not, and which has been partly vulcanized has a certain degree of elasticity and firmness, and will not normally require the use of a cooling device such as heretofore described. Also such compounds as contain large percentages of other materials, besides the gum binders, are directly benefited by the method steps herein disclosed.

The refrigerating device, Figure 23, comprises a rotary pump 195 for advancing a cooling medium through a series of connected pipes or tubular system 196, which are confined inside a casing 199. In order to make this lower temperature condition more directly effective on the sheet material or on the dies of the pressing device, air is admitted into an auxiliary chamber 197 through conduits 200. This air is then caused to pass downwardly through small perforations 198 in the casing 199 and to come in contact or into close proximity with the pipes 196. Heat is quickly removed from the air, so that by the time this air reaches the sheet material or the dies, it will function most effectively to establish the lower temperature required.

The milk bottle cap, or cup form shown in Figure 25, has a relatively long skirted portion 201, and a relatively large downwardly-pressed center section 202, the purpose of which is to set fairly well down into the mouth of a milk bottle, so that during expansion such as by freezing or by excessive heat from the sun, the center section of the cap will gradually expand outwardly, the cap having sufficient material therein to remain sealed on the bottle. If this cap is formed of a thermo-plastic sheet material, an excellent seal will be provided around the contracted neck portion below the bead of the bottle particularly if a heated smoothing element is used in a rotary fashion or as an ironing device to confine the skirted portion to the bottle neck, during capping.

The particular pleated article herein shown illustrates the uses of process and machine elements, but the invention as a whole is quite diversified and permits the shaping of almost any known hollow article. It should be apparent that pleated side walls are not an essential adjunct in the practice of this process, although illustrative in the matter of invention.

What I claim as new and desire to secure by Letters Patent is:—

1. The method of forming an article from a flat sheet of cellulosic composition, which comprises rigidly clamping the sheet around the outline of a blank between elastically yielding clamping means to permit a degree of concentric yielding of the blank in the direction of subsequent stretching action, stretching the blank by moving a portion thereof out of the original plane of the sheet and toward the desired final shape of the article to be produced, then cutting around the outline of the blank thus clamped and stretched, and thereafter completing the formation of the article.

2. The method of shaping an article from a flat film or sheet of a normally water-repelling, slightly-extensible, non-elastic nature, comprising clamping the sheet along the outline of a required blank area, stretching the blank thus defined by partly shaping it, severing the stretched blank from the surrounding flat sheet, subjecting the severed blank to the influence of softening agencies to induce a temporary state of yieldability therein, and completing the shaping of the blank into the desired article.

3. The method of operating on a thinly sheeted, softly pliant, slightly extensible and non-resilient sheet material to make blanks and shaped articles therefrom, which comprises clamping and indenting the sheeted material to a uniform depth along the entire outline of the area required for the blank, tensioning the sheet material of said area by the application of pressure thereagainst to make it rigidly receptive to penetration by cutting edges, forming the blank by cutting through the material at the clamped outline adjacent the line of indentation, and thereafter shaping the blank by die manipulation in one operation.

4. The method of shaping a cupped object with pleated side walls from a sheet material of plastic properties and cellulosic composition, which comprises forming a groove in the sheet along the marginal edge of the section of the sheet which is to be shaped, gripping the sheet firmly at said groove to prevent slipping, then impressing and drawing said section concentrically in opposite directions between a series of spaced portions of shaping dies to position the section concentrically of the dies and to tension the material, cutting through the material at the edge of said groove to detach the impressed section from the sheet, softening the section by introducing heated air between the dies, and then cupping the blank and forming pleated side walls thereon by closing the dies together.

5. The method of shaping a sheet blank of one kind of material, selected from the group consisting of natural or artificial organic plastic materials and cellulosic fibrous materials, into an article impregnated with another material, which comprises forming the article by drawing and pressing a sheet blank of the first named material between spaced shaping parts of coacting forming members during a single movement of approach of one of said members toward the other, and applying an impregnating material to the blank operated on between said members during said movement thereof.

6. The method of shaping an article from sheeted organic plastic materials which set to firmness when pressed and heated, comprising clamping a predetermined portion of the sheet at its periphery, die-pressing this portion to impart a concentric shape for alignment with the dies, severing the shaped portion from the surrounding sheet to provide a marginally unsupported, but centrally die-supported blank, shaping the blank by moving it as a whole and relatively moving different portions thereof simultaneously in opposite directions between shaping dies, admitting a heating fluid between the dies to soften the blank during this shaping, confining the material between the dies and subjecting it to the amount of pressure and the temperature required to set the material to firmness, and maintaining this heat and pressure treatment during the period of time which is required to impart a permanent shape to the finished article.

7. The method of shaping an article from a semi-rigid, porous, normally non-stretchable sheet material, which can be softened and made extensible by heat and moisture, which comprises clamping the sheet to retain a non-slip hold around the outline of the area required for the article, heating and applying deflecting pressures in opposite directions simultaneously at spaced points of the clamped area, cutting through the sheet material along the clamped outline to form a detached blank while deflecting the pressed points to their final position, subjecting the said blank during said deflection to the action of a moist atmosphere, and then pressing the material of the said blank to a retentive set and into final shape as the said points assume their final position.

8. The method of producing blanks of fixed outline, for subsequent formative uses, from a slightly extensible, pliant, relatively unstable and fragile sheet material, which lacks the hardness required for penetration by cutting means, which comprises gripping the sheet material with softly padded clamping means around the outline of the portion of the sheet of which it is proposed to form a blank, then applying a progressively increasing pressure to the gripped portion from opposite directions and at spaced points thereof to stretch the material to a condition of hardness, and then cutting said portion away from the sheet along said outline during an instant of induced hardness and susceptibility of the material to penetration by cutting means.

9. The method of shaping articles from a continuously moving sheet material which becomes plastic when moist, which comprises clamping and holding fast on the sheet along the outline of a required blank portion for the article while moving the sheet and the clamping means in the same direction, impressing solid parts against the material inside the clamped outline to deflect it in different directions thereby to tension the material, cutting around said portion during the deflection thereof as aforesaid to detach it from the sheet, continuing the deflection of said portion with said solid parts operating on the blank in opposite directions until said portion is in a position of rest between said parts, communicating moisture to the material of said portion when it is detached from the sheet, and expelling the moisture from said portion when it arrives in the position of rest.

10. The method of forming hollow articles from a thermo-plastic sheet body of transparent material which is extensible at normal temperatures, which comprises reducing the temperature of the sheet to a point sufficient to impart a desired stiffness of body thereto, clamping the sheet around the outline of the area required to form the blank for the article, cutting a blank from the sheet while simultaneously impressing and aligning the blank with correlated forming means which are cooled to prevent increase of the temperature of the material, moving those portions of the blank, which are to form the side walls of the article, freely in the direction of the final position thereof while momentarily confining a heated media in gaseous form around the blank to soften the material, removing heat from the material when in its final position, producing suction to hold the resulting article selectively in one of the forming means, and then applying air under increased pressure to eject it from said forming means.

11. The process of forming shaped articles from various sheet materials of cellulosic composition, which comprises forming an enclosed space encircling a portion of said sheet, rigidly clamping said portion of said sheet around the periphery of said enclosed space, placing said portion under tension, cutting the same around said periphery to form a blank, shaping said blank by a die-pressing operation conducted within said enclosed space, and treating said blank prior to said pressing operation with a fluid introduced into said enclosed space at a temperature different from that of said dies.

12. The process of claim 11 wherein the sheet material is of paper, and steam is injected into said enclosed space during the die-pressing operation.

13. The process of claim 11 wherein at least one side of said blank is subjected to a vacuum during said die-pressing operation.

14. The process of claim 11 wherein a fluid coating composition is applied to the face of at least one die prior to the die-pressing operation.

15. In the manufacture of milk bottle caps from thermo-pliant sheet material of cellulosic composition, the process which comprises rigidly clamping said sheet between a pair of opposed, cup shaped, die-holding members, thereby encircling a blank portion of said sheet within an enclosed space formed by said members, tensioning said blank portion, cutting around the periphery of said blank portion inside said enclosed space, thereby producing a blank which is marginally unsupported, die-pressing said blank by clamping it between heated dies within said enclosed space to form a corrugated or pleated skirt portion thereon, treating said blank with steam injected into said enclosed space prior to the completion of the die-pressing operation aforesaid, subjecting at least one side of said blank to a vacuum while it is clamped between said dies, holding said blank clamped between said dies until it is substantially dry, and then releasing the resulting formed milk bottle cap from said enclosed space.

16. The method of forming hood caps from a form-retaining sheeted material which becomes soft and is reshapable when heated, comprising clamping the sheeted material at and along the outlines of flat portions which are to be formed into caps, softening said portions by heat treatment, pressing and shaping the softened portions of the sheeted material into hood caps, and during such shaping separating each hood cap from the sheet.

ENOCH T. FERNGREN.

CERTIFICATE OF CORRECTION.

Patent No. 2,120,328.   June 14, 1938.

ENOCH T. FERNGREN.

It is hereby certified that error appears in the printed specification of the above numbered patent requiring correction as follows: Page 1, first column, line 46, after "required" insert the word blank; page 10, first column, line 34-35, strike out the words "vacuum action in the"; and that the said Letters Patent should be read with this correction therein that the same may conform to the record of the case in the Patent Office.

Signed and sealed this 26th day of July, A.D. 1938.

(Seal)

Henry Van Arsdale,
Acting Commissioner of Patents.

position of rest between said parts, communicating moisture to the material of said portion when it is detached from the sheet, and expelling the moisture from said portion when it arrives in the position of rest.

10. The method of forming hollow articles from a thermo-plastic sheet body of transparent material which is extensible at normal temperatures, which comprises reducing the temperature of the sheet to a point sufficient to impart a desired stiffness of body thereto, clamping the sheet around the outline of the area required to form the blank for the article, cutting a blank from the sheet while simultaneously impressing and aligning the blank with correlated forming means which are cooled to prevent increase of the temperature of the material, moving those portions of the blank, which are to form the side walls of the article, freely in the direction of the final position thereof while momentarily confining a heated media in gaseous form around the blank to soften the material, removing heat from the material when in its final position, producing suction to hold the resulting article selectively in one of the forming means, and then applying air under increased pressure to eject it from said forming means.

11. The process of forming shaped articles from various sheet materials of cellulosic composition, which comprises forming an enclosed space encircling a portion of said sheet, rigidly clamping said portion of said sheet around the periphery of said enclosed space, placing said portion under tension, cutting the same around said periphery to form a blank, shaping said blank by a die-pressing operation conducted within said enclosed space, and treating said blank prior to said pressing operation with a fluid introduced into said enclosed space at a temperature different from that of said dies.

12. The process of claim 11 wherein the sheet material is of paper, and steam is injected into said enclosed space during the die-pressing operation.

13. The process of claim 11 wherein at least one side of said blank is subjected to a vacuum during said die-pressing operation.

14. The process of claim 11 wherein a fluid coating composition is applied to the face of at least one die prior to the die-pressing operation.

15. In the manufacture of milk bottle caps from thermo-pliant sheet material of cellulosic composition, the process which comprises rigidly clamping said sheet between a pair of opposed, cup shaped, die-holding members, thereby encircling a blank portion of said sheet within an enclosed space formed by said members, tensioning said blank portion, cutting around the periphery of said blank portion inside said enclosed space, thereby producing a blank which is marginally unsupported, die-pressing said blank by clamping it between heated dies within said enclosed space to form a corrugated or pleated skirt portion thereon, treating said blank with steam injected into said enclosed space prior to the completion of the die-pressing operation aforesaid, subjecting at least one side of said blank to a vacuum while it is clamped between said dies, holding said blank clamped between said dies until it is substantially dry, and then releasing the resulting formed milk bottle cap from said enclosed space.

16. The method of forming hood caps from a form-retaining sheeted material which becomes soft and is reshapable when heated, comprising clamping the sheeted material at and along the outlines of flat portions which are to be formed into caps, softening said portions by heat treatment, pressing and shaping the softened portions of the sheeted material into hood caps, and during such shaping separating each hood cap from the sheet.

ENOCH T. FERNGREN.

CERTIFICATE OF CORRECTION.

Patent No. 2,120,328.     June 14, 1938.

ENOCH T. FERNGREN.

It is hereby certified that error appears in the printed specification of the above numbered patent requiring correction as follows: Page 1, first column, line 46, after "required" insert the word blank; page 10, first column, line 34-35, strike out the words "vacuum action in the"; and that the said Letters Patent should be read with this correction therein that the same may conform to the record of the case in the Patent Office.

Signed and sealed this 26th day of July, A.D. 1938.

(Seal)

Henry Van Arsdale,
Acting Commissioner of Patents.

CERTIFICATE OF CORRECTION.

Patent No. 2,120,328. June 14, 1938.

ENOCH T. FERNGREN.

It is hereby certified that error appears in the printed specificati of the above numbered patent requiring correction as follows: Page 1, fir column, line 46, after "required" insert the word blank; page 10, fir column, line 34-35, strike out the words "vacuum action in the"; and th the said Letters Patent should be read with this correction therein th the same may conform to the record of the case in the Patent Office.

Signed and sealed this 26th day of July, A.D. 1938.

(Seal)

Henry Van Arsdale,
Acting Commissioner of Patents